Oct. 7, 1969  F. TSCHAPPU  3,470,814

DEVICE FOR HEAT-SEALING THERMOPLASTIC BANDS

Filed May 3, 1967  3 Sheets-Sheet 1

INVENTOR.
FRANZ TSCHAPPU

BY Karl G. Ross

ATTORNEY

Oct. 7, 1969  F. TSCHAPPU  3,470,814
DEVICE FOR HEAT-SEALING THERMOPLASTIC BANDS
Filed May 3, 1967  3 Sheets-Sheet 3

INVENTOR.
FRANZ TSCHAPPU
BY
Karl G. Ross
ATTORNEY

United States Patent Office 3,470,814
Patented Oct. 7, 1969

3,470,814
DEVICE FOR HEAT-SEALING THERMO-PLASTIC BANDS
Franz Tschappu, 15 Dienerstrasse,
8004 Zurich, Switzerland
Filed May 3, 1967, Ser. No. 635,836
Claims priority, application Switzerland, May 4, 1966,
6,497/66
Int. Cl. B65b *13/04, 13/32;* C09j *5/06*
U.S. Cl. 100—4                                    6 Claims

ABSTRACT OF THE DISCLOSURE

In tying an article with heat-sealable tape, a terminal portion of a length of such tape is wound around the article whereupon the free end of the tape is clamped against a supporting plate, the tape is tensioned to form a tight loop around the article and the plate, the tape is further clamped against the supporting plate at a point separated by the loop from the clamped end thereof, a heating foil interposed between the clamped end thereof, a heating foil interposed between the clamped end and an overlapping tape portion is energized with exertion of light pressure by a plunger acting upon the overlapping portion, the tape is cut beyond the region of overlap whereupon the pressure is sharply increased with rapid withdrawal of the heating foil, and the plunger is then retracted after the heat-sealed ends have cooled sufficiently to sustain the tension of the looped tape; finally, the supporting plate is pulled out of the loop.

---

My present invention relates to an apparatus for tying an article with tape of heat-sealable material, such as thermoplastic resin.

Prior attempts of using heat-sealable tapes to form loops around packages and the like have been only partly successful, mainly because of the relatively long heating period required to fuse the two ends of the loop together. It was also difficult, especially with automatic equipment, to make the loop tight and maintain the tension during the heat-sealing step.

The general object of this invention, therefore, is to provide an apparatus for tying such loops of thermally bondable and, preferably, resilient material (e.g. polyethylene) in an efficient and rapid manner suitable for assembly-line operation.

In a system according to my invention, a length of tape of the character described is looped around the article to be tied, one end of this tape being temporarily clamped against the article—preferably with interposition of a rigid counterplate which may also serve as a support for the article—whereupon, advantageously after a tightening of the loop, another portion of the tape is similarly clamped adjacent a location where this latter portion overlaps the aforementioned free end, a flat heating element such as a resistance foil being inserted between these overlapping tape sections whereupon the sandwich so formed is subjected to a relatively low preliminary bonding pressure applied from without. This bonding pressure is independent of the clamping pressure exerted upon opposite ends of the loop and should be just sufficient to insure heat-transmitting contact between the foil and the two thermoplastic layers without, however, causing adhesion between the tape and the foil. After a heating period which should be so short as to limit the softening of the thermoplastic material to the confronting layer surfaces, the foil is rapidly withdrawn with maintenance and preferably increase of the bonding pressure to complete the seal. After the overlapping layers have cooled sufficiently to solidify the bond, the tape is unclamped whereupon the interposed counterplate, if present, may be removed to let the loop contract under its own resiliency.

Usually, the length of tape used to form the loop will be a terminal portion of a longer piece taken from a supply reel or the like. In this case the loop is severed from the remaining length of tape before release of the clamping pressure, preferably at about the time of application of the initial bonding pressure.

In a particularly advantageous embodiment, an apparatus designed to perform the aforedescribed operations includes a pair of tape-clamping grippers and a plunger actuatable to apply the bonding pressure in response to the operation of the second gripper. For two-stage actuation with increase of bonding pressure upon withdrawal of the heating element, the plunger may comprise a head movable under spring pressure relative to a mechanically, hydraulically, pneumatically or electromagnetically operated piston on which it is carried; the second-stage pressure increase is produced by a forward stroke of this piston under the control of a suitable timer which also determines the operating sequence of the grippers and the tape-cutting device.

The above and other features of my invention will become more fully apparent from the detailed description given with reference to the accompanying drawing in which.

Figure 1:
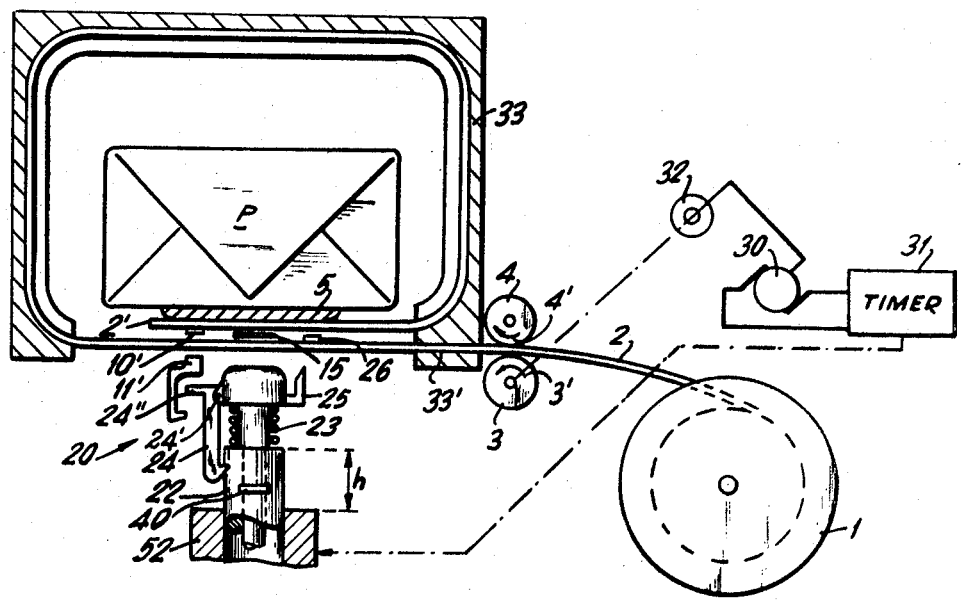
FIG. 1 is a diagrammatic, partly sectional elevational view of an apparatus for heat-sealing a thermoplastic tape in accordance with my invention, shown in an initial stage of operation.

Reference will first be made to FIGS. 1–5 showing a reel 1 from which a tape 2, of polyethylene or similar plastic material, is progressively drawn by a feed roller 3 cooperating with a counterroller 4, the two rollers being initially driven in the direction of arrows 3′ and 4′ (FIG. 1) by a reversible motor 30 which is under the control of a timer 31 and is coupled with roller 3 by way of a friction clutch 32. A frame 33 guides a terminal portion of tape 2 in a rectangular loop around a package P representing an article to be tied, this package resting on a table 6 (FIG. 5) and being supported in the region of frame 33 by a plate 5 separated from the table surface by a gap 7. Plate 5 may form part of the table structure or may be removable therefrom.

Figure 2:
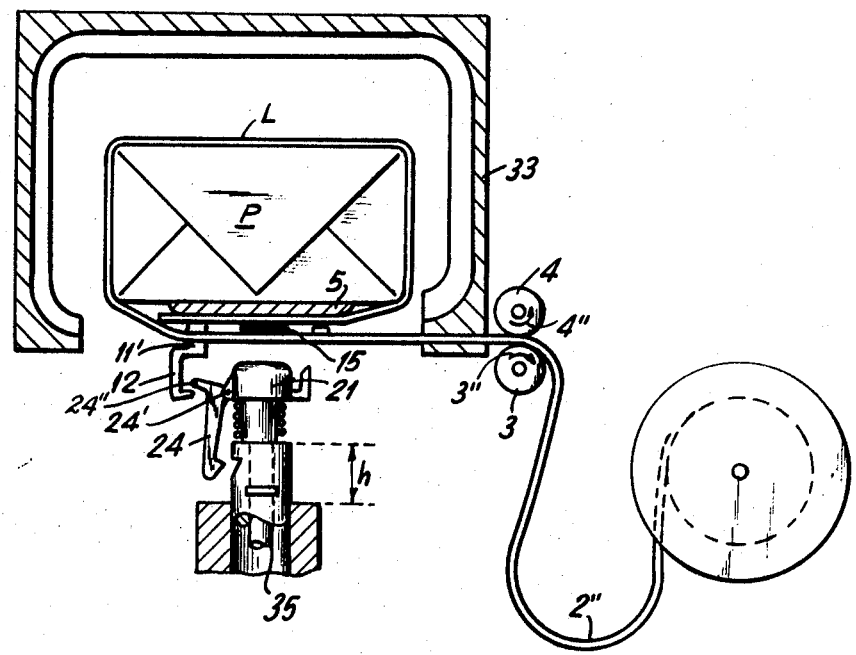
FIGS. 2, 3 and 4 are views similar to FIG. 1, showing successive further stages.

An arm 34 rigid with supporting plate 5 carries a pair of solenoids 50, 51 and forms part of a base, not further illustrated, which also supports a stationary hydraulic or pneumatic cylinder 52 having a piston 22 projecting upwardly therefrom. A pair of levers 10 and 11, both fulcrumed on a fixed pivot pin 53, have their rear extremities articulated to the cores of solenoids 50 and 51, respectively. The front ends 10′ and 11′ of these levers form a pair of gripper jaws, the first jaw 10′ serving to clamp the free end 2′ of tape 2 against plate 5 while the second jaw 11′ is engageable with another tape portions, overlapping the end 2′, to clamp it against jaw 10′ and thus indirectly against plate 5 as illustrated in FIG. 2. Solenoids 50 and 51 are also controlled by the timer 31.

Slidably guided in piston 22 is a plunger 35 having a head 21 which is urged upwardly by a spring 23, such upward motion relative to the piston being normally prevented by a latch 24 which is pivoted at 24' to the head 21 and has a spur 24" engageable by a hook 12 integral with lever 11. Piston 22 and plunger head 21 together form an assembly 20 for the exertion of bonding pressure, in two successive stages, upon a region of the overlapping tape portions between which a heated foil 15 is removably interposed. Foil 15 is connected by flexible wiring 36 to a source of heating current, not shown, and is carried on an arm 37 swingable about a fixed fulcrum 38; an extension 37' of this arm, biased downwardly by a spring 39, bears upon a lug 40 projecting from piston 22.

A cutting mechanism for severing the looped portion L of tape 2 from the remainder thereof comprises a movable blade 25, rigid with head 21, and a fixed counterblade 26.

In operation, timer 31 is started (e.g., by means of a pedal not shown) after the package P has been properly positioned on table 6 and plate 5. Motor 30 operates in a forward direction so that the tape 2, guided in a slot 33' of frame 33, advances within the frame and is deflected to form a relatively large loop around the package as shown in FIG. 1; the forward drive is arrested as soon as the free end 2' of the tape reaches a position overlying the tip 10' of lever 10. It is assumed, of course, that the tape is stiff enough to bridge the open bottom of the frame yet sufficiently flexible to bend in conformity with the rectangular outline thereof; this injection of a fresh length of tape into the frame 33 takes place very rapidly. Next, solenoid 50 is energized to swing the lever 10 clockwise (as viewed in FIG. 5) whereby the end 2' of the tape at one side of the loop is firmly clamped in position between plate 5 and tip 10'. Then, motor 30 is reversed so that rollers 3 and 4 rotate in the opposite direction as indicated by arrows 3" and 4" in FIG. 2; this causes a slackening of the tape at 2" between the rollers and the reel 1. The loop-tightening operation of motor 30 should last long enough to accommodate packages of predetermined minimum girth; with larger packages, clutch 32 starts slipping after the tape has been sufficiently tensioned. Since the foward motion of the tape does not encounter any appreciable resistance, this clutch does not slip during feeding.

After the loop L has been tightened as illustrated in FIG. 2, solenoid 51 comes into play whereby the tape at the other side of the loop is additionally clamped between grippers 10' and 11'. At the same time, hook 12 trips the latch 24 so that plunger head 21 moves upwardly under the urging of spring 23, thereby lightly compressing the foil 15 between the two overlapping portions of tape 2. This rise of head 21 brings the blade 25 up against counterblade 26 to sever the tightened loop from the main body of tape 2, as illustrated in FIG. 3.

Up to this time, piston 22 has remained in its retracted position in which its upper end projects only by a relatively small distance h above cylinder 52. With heating foil 15 now energized, the adjacent tape surfaces begin to soften; before, however, the heating effect has completely penetrated the thermoplastic layers, timer 31 causes the admission of operating fluid to cylinder 52 to drive the plunger 22 upwardly to the level H shown in FIG. 4. This action abruptly increases the pressure exerted by head 21 upon the heated tape 2 and recompresses the spring 23, with latch 24 re-engaging the notch of piston 22 to restore the relationship of these parts shown in FIG. 1. The rise of plunger 22 also has swung the arm 37 into its alternate position (dot-dash lines, FIG. 5), resulting in a substantially instantaneous withdrawal of foil 15 from between the two heated thermoplastic layers. The latter are now pressed firmly against each other to seal the ends of the loop together. After the weld has cooled sufficiently to resist the tensile stresses of the loop, cylinder 52 is vented and solenoids 50 and 51 are released to re-establish the initial position of the system preparatory to the start of a new cycle.

Figure 3:
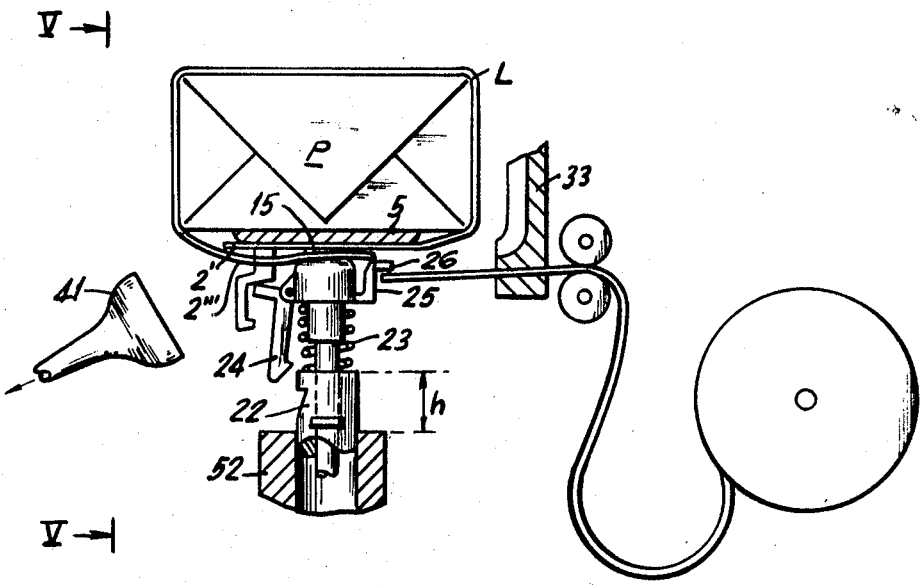
Figure 4:
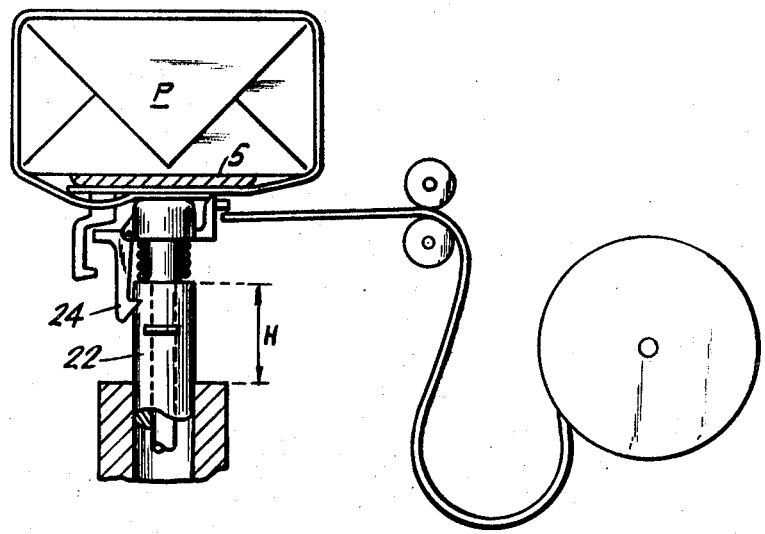
Figure 5:
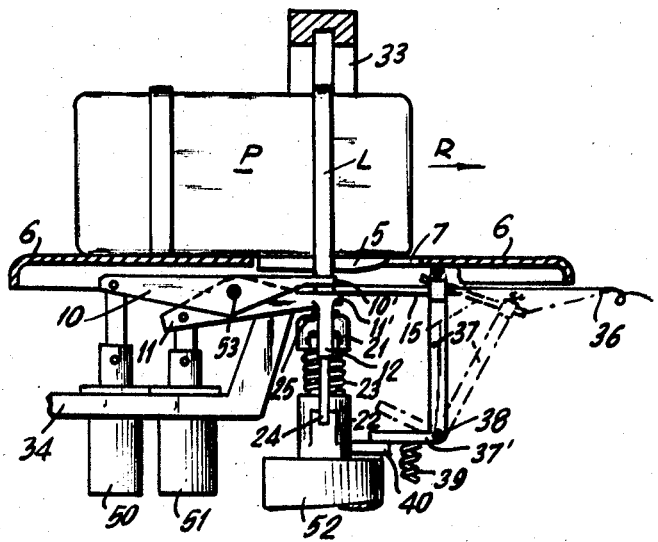
FIG. 5 is a side-elevational view of the assembly in the third operating stage as taken on the line V—V of FIG. 3.

If the heating of the thermoplastic material gives rise to objectionable fumes, a suction device 41 may be installed next to assembly 20 as illustrated in FIG. 3. The air stream generated by this suction device may also help cool the apparatus.

To detach the tied package from its support 5, it can be moved forwardly in the direction of arrow R (FIG. 5) until the loop L formed by the tape reaches the gap 7.

Since the removal of foil 15 takes place without any release of bonding pressure, no air occlusions can be formed between the overlapping tape portions to be heat-sealed to each other.

In practice, the sequence of steps just described can be performed in a very short time, e.g. in about 1 or 2 seconds.

Figure 6:
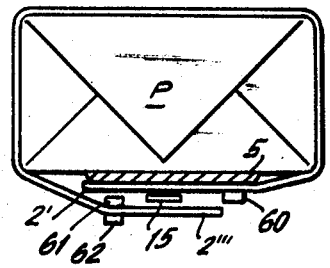
FIGS. 6 and 7 are further views generally similar to FIG. 2, illustrating two modifications.
Figure 7:
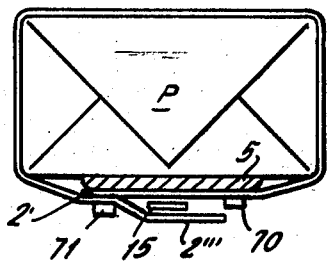

With the arrangement shown in FIGS. 1–5, one of the thermoplastic layers to be bonded is under continuous tensile stress during the sealing operation. For stress-free bonding it is possible to use a modified arrangement as shown in FIG. 6 wherein a first gripper 60 engages the tape slightly inwardly of its free end 2' whereas another gripper 62 bears upon the overlapping portion 2''', with interposition of a movable anvil 61 between the two layers, at a location opposite gripper 60 with reference to foil 15. A simplified arrangement, omitting the anvil, is shown in FIG. 7 where grippers 70 and 71 are again disposed on opposite sides of foil 15, gripper 71 clamping tape ortion 2''' against supporting plate 5 through the intermediary of layer 2'; where the surface of the tape is so smooth that this arrangement may lead to slippage of tape portion 2''' on tape portion 2', the latter may be slightly foreshortened so that portion 2''' is also pressed directly against plate 5.

Other modifications of the arrangements particularly described and illustrated are, of course, possible. Thus, for example, the tape 2 may be looped manually around the package P, with omission of frame 33.

I claim:

1. An apparatus for tying an article with heat-sealable tape, comprising a supporting plate for an article to be tied; feed means for winding a terminal portion of a heat-sealable tape in a loop around said article and said supporting plate; first gripper means for clamping a free end of said tape on one side of said loop against said supporting plate; second gripper means for clamping a portion of said tape on the other side of said loop adjacent a region of overlap between said portion and said free end; a flat heating element interposable between said portion and said free end in said region of overlap; plunger means adjacent said region for exerting bonding pressure upon said portion, said heating element and said free end; mechanism for withdrawing said heating element; timer means for sequentially operating said feed means, said first and second gripper means, said heating element and plunger means, and said mechanism whereby said free end is sealed to said overlapping portion; and cutter means for severing said loop from the remainder of said tape beyond said overlapping portion, said plunger means being provided with two-stage actuating means controlled by said timer means for exerting relatively light bonding pressure during energization of said heating element and relatively heavy bonding pressure upon withdrawal of said heating element.

2. An apparatus as defined in claim 1 wherein said actuating means comprises a piston, said plunger means comprising a spring-loaded head carried on said piston with freedom of relative motion and latch means normally preventing said relative motion, said latch means being positioned for engagement by said second gripper means to release said head prior to displacement of said piston whereby said head is urged under spring pressure against said overlapping portion.

3. An apparatus as defined in claim 2 wherein said cutter means is coupled with said head for operation thereby upon release of said head by said latch means.

4. An apparatus as defined in claim 1 wherein said feed means is reversible by said timer means for tightening said loop about said article and said plate after operation of said first gripper means and before operation of said second gripper means.

5. An apparatus as defined in claim 4 wherein said feed means includes a slipping clutch effective during reverse operation thereof.

6. An apparatus as defined in claim 1 wherein said supporting plate forms part of a table having a gap adjacent said plate for facilitating withdrawal of the latter from said loop.

References Cited

UNITED STATES PATENTS

| | | | |
|---|---|---|---|
| 3,233,385 | 2/1966 | Lyon | 53—198 |
| 3,269,300 | 8/1966 | Billett et al. | 100—8 |
| 3,368,323 | 2/1968 | Wood | 53—198 |

BILLY J. WILHITE, Primary Examiner

U.S. Cl. X.R.

53—198; 100—14, 26, 33; 156—306